(12) United States Patent
Niessen et al.

(10) Patent No.: US 7,181,325 B2
(45) Date of Patent: Feb. 20, 2007

(54) STEERING MECHANISM OF A VEHICLE, COMPRISING A VARIABLE CENTERING DEVICE

(75) Inventors: Harwin Niessen, Kirchheim u. Teck (DE); Roman Frank Starbeck, Esslingen (DE)

(73) Assignee: ThyssenKrupp Presta SteerTec GmbH (DE)

( * ) Notice: Subject to any disclaimer, the term of this patent is extended or adjusted under 35 U.S.C. 154(b) by 344 days.

(21) Appl. No.: 10/505,726

(22) PCT Filed: Dec. 4, 2002

(86) PCT No.: PCT/EP02/13722

§ 371 (c)(1), (2), (4) Date: Aug. 25, 2004

(87) PCT Pub. No.: WO03/072417

PCT Pub. Date: Sep. 4, 2003

(65) Prior Publication Data

US 2005/0154514 A1    Jul. 14, 2005

(30) Foreign Application Priority Data

Feb. 28, 2002   (DE) ............................... 102 08 673

(51) Int. Cl.
*B62D 6/00* (2006.01)
*G06F 17/00* (2006.01)

(52) U.S. Cl. ........................... 701/41; 701/42; 180/443
(58) Field of Classification Search .................. 701/41, 701/42; 180/412, 415, 443, 445, 446; 318/432
See application file for complete search history.

(56) References Cited

U.S. PATENT DOCUMENTS 4,800,975 A    1/1989   Oshita et al.

(Continued)

FOREIGN PATENT DOCUMENTS

DE    39 18 987    12/1989

(Continued)

*Primary Examiner*—Tan Q. Nguyen
(74) *Attorney, Agent, or Firm*—Robert W Becker & Associates; Robert W Becker

(57) ABSTRACT

A vehicle steering system having a steering handle for steering at least one wheel is provided, and includes an arrangement for applying torque to the steering handle and a sensor for detecting applied steering torque. The arrangement generates a return torque, as a function of the steering angle, for driving the steering handle into a central position. During a first driving state in which applied steering torque is above a threshold value, the function curve of the return torque increases monotonically and no return torque is generated at a steering angle of zero. During a second driving state in which applied steering torque is below the threshold value, the arrangement generates a return torque that is greater than that given by the function curve in the first driving state, at least at small steering angles.

10 Claims, 2 Drawing Sheets

U.S. PATENT DOCUMENTS

| | | | |
|---|---|---|---|
| 4,909,343 A | 3/1990 | Mouri et al. | |
| 5,072,803 A | 12/1991 | Kilian et al. | |
| 5,273,129 A | 12/1993 | Wright et al. | |
| 5,704,446 A * | 1/1998 | Chandy et al. | 180/446 |
| 5,803,202 A | 9/1998 | Bohner et al. | |
| 5,828,972 A | 10/1998 | Asanuma et al. | |
| 6,138,788 A | 10/2000 | Bohner et al. | |
| 6,459,971 B1 * | 10/2002 | Kurishige et al. | 701/41 |
| 6,505,703 B2 * | 1/2003 | Stout et al. | 180/446 |
| 6,625,530 B1 * | 9/2003 | Bolourchi | 701/42 |
| 2002/0017885 A1 * | 2/2002 | Endo | 318/432 |

FOREIGN PATENT DOCUMENTS

| | | |
|---|---|---|
| DE | 40 09 400 | 9/1991 |
| DE | 44 10 361 | 9/1995 |
| DE | 198 48 445 | 5/2000 |
| DE | 199 08 832 | 9/2000 |

* cited by examiner

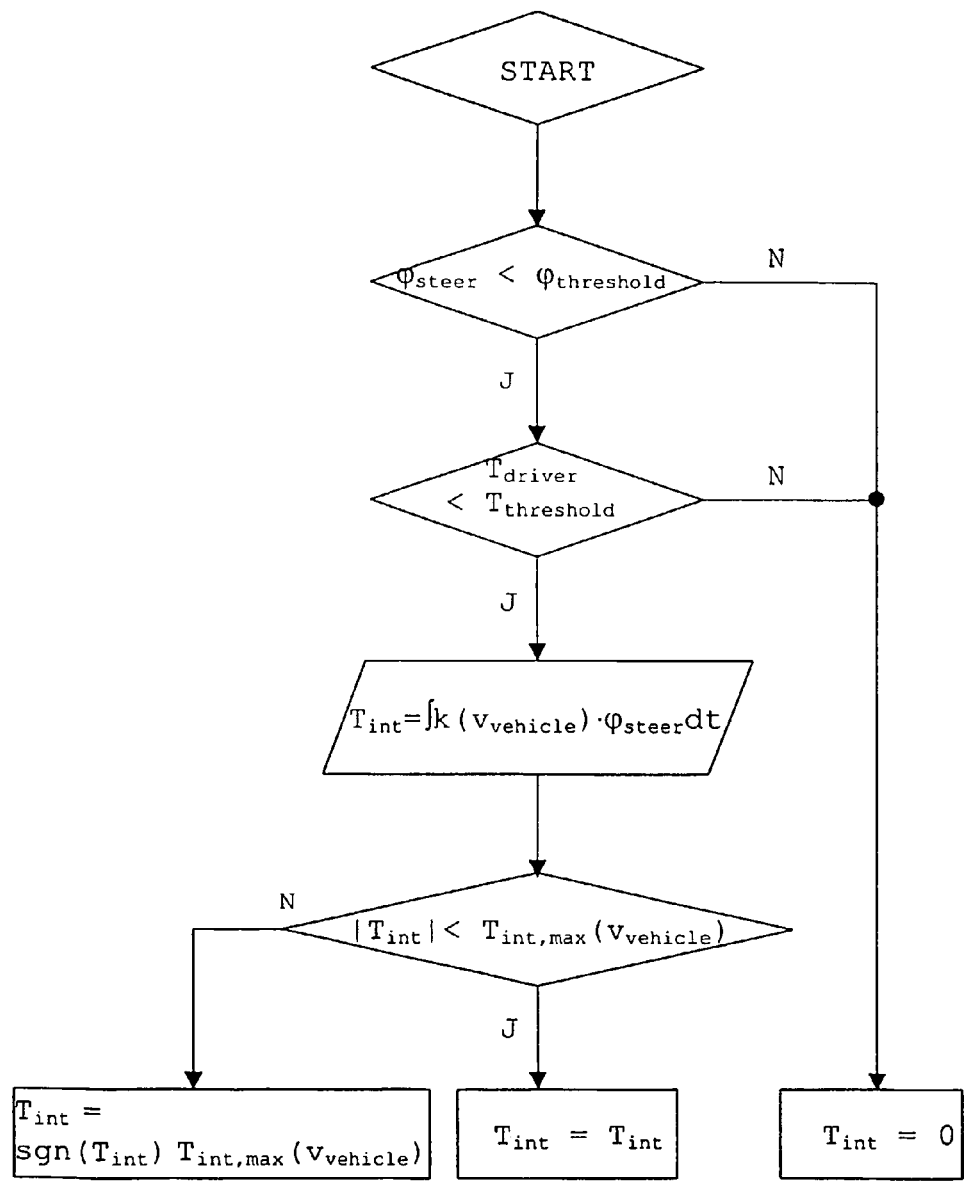

STEERING MECHANISM OF A VEHICLE, COMPRISING A VARIABLE CENTERING DEVICE

BACKGROUND OF THE INVENTION

The present invention relates to a vehicle steering system having a steering handle for steering at least one wheel, the steering system having an arrangement for applying a torque to the steering handle and a sensor for detecting the steering torque $T_{driver}$ applied to the steering handle by the person steering the vehicle, the arrangement generating a return torque $T_{return}$ which is a function $F(\phi_{steer})$ of the steering angle $\phi_{steer}$, and the return torque $T_{return}$ driving the steering handle to a central position ($\phi_{steer}=0°$).

The return of the vehicle steering system restores a vehicle that has been turned to straight-line travel. Exact automatic centering by the vehicle steering system itself is also desirable when, inter alia, the person steering the vehicle is not touching the steering wheel or is only applying a very small force to it.

When a vehicle steering system performing an active return is being produced, there are, as things stand at the moment with regard to production, always two conflicting aims which arise relating to the generation of the return torque. On the one hand the vehicle steering system must have good centering with the residual angle being only minimal and on the other hand it must transmit a harmonized feel from the steering, particularly when steering takes place through the central position.

To obtain very good centering with the residual angle being only minimal, a prerequisite is a function curve for the restoring force such as is shown by the dashed curve in FIG. 1. In this case, a return torque or force $T_{return}$ is generated down to a steering-wheel angle of 0° (zero degrees), which means that the steered wheels are adjusted to the central position even when travelling slowly. However, due to the discontinuity in the path followed by the curve, the feel given by the steering is unpleasant when steering through the center if the person steering the vehicle has his hands on the steering handle or steering wheel.

However, a harmonized feel from the steering when steering through the zero position (central position) can only be obtained with a torque curve $f_1(\phi_{steer})$ for the return torque $T_{return}$ of the kind which is indicated by the solid curve in FIG. 1. However, exact centering is not obtained with a return torque $T_{return}$ of this kind because, due to the decline in the return torque, there is still a residual angle, particularly at low vehicle speeds and/or when there is a high opposing torque due to friction.

The object underlying the invention is therefore to provide a vehicle steering system in which there is a harmonized feel from the steering with, at the same time, exact centering even at low vehicle speeds.

SUMMARY OF THE INVENTION

This object is achieved by a steering system where during a first driving state in which an applied steering torque $T_{driver}$ is above a threshold value $T_{threshold}$, a function curve f1 ($\phi_{steer}$) of said return torque $T_{return}$ increases constantly or monotonically and no return torque $T_{return}=0°$ is generated at a steering angle of zero degrees $\phi_{steer}=0°$, and where during a second driving state in which an applied steering torque $T_{driver}$ is below the threshold value $T_{threshold}$, the arrangement generates a return torque $T_{return}$ that is greater than that given by the function curve f1 ($\phi_{steer}$) of the return torque in the first driving state, at least at small steering angles.

BRIEF DESCRIPTION OF THE DRAWINGS

The objects and advantages of the present invention will furthermore appear more clearly from the following specification in conjunction with the accompanying schematic drawings, in which:

FIG. 3 shows a flow chart for a further embodiment.

Figure 1:
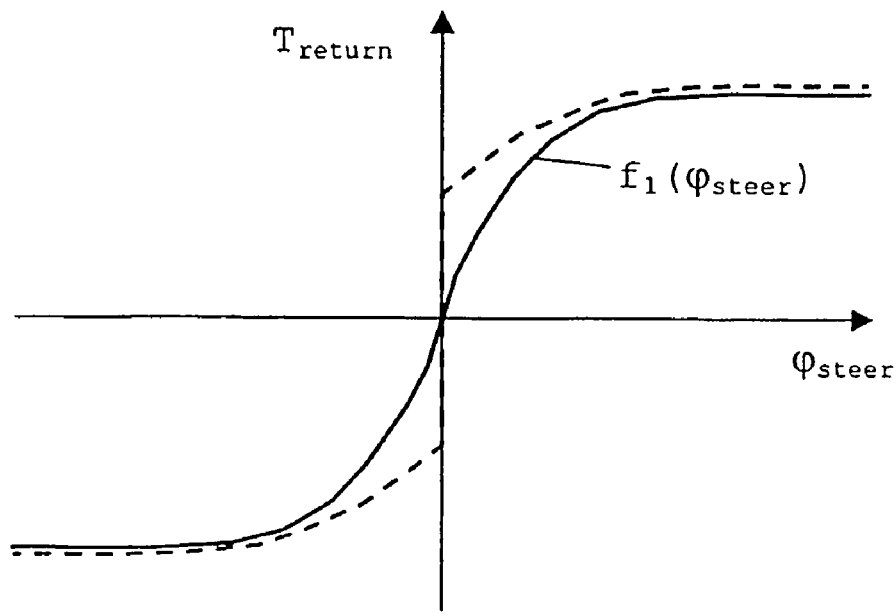
FIG. 1 shows a function curve for the return torque.

What is advantageously achieved by means of the invention is excellent centering with, at the same time, a harmonized feeling from the steering when steering through the central position. This is achieved by virtue of the fact that, when the vehicle is in different driving states or operating states, return torques $T_{return}$ of different sizes are preset or adjusted to by the vehicle steering system. In this way, a torque curve $f_1(\phi_{steer})$ of the kind shown by the solid line in FIG. 1 is always preset when the person steering the vehicle applies a manual torque of more than a threshold value $T_{threshold}$ to the steering wheel. This is generally the case when there is some active intervention by the driver on the steering. As soon as the manual torque drops below the threshold value, i.e. if the driver releases the steering wheel, then, in the simplest case, a curve of, for example, the kind shown by the dashed curve in FIG. 1 is preset for the return torque. However, within the scope of the invention, it is possible for any desired shape of curve or even any other desired functions to be preset or selected for the return torque in the second driving state. It merely needs to be ensured that a sufficiently large return force, i.e. a sufficiently large return torque, is generated, particularly at small steering angles, for the wheels which have been steered away from the central position to be moved to it.

Depending on the speed of the vehicle, forces of different sizes are required to move the wheels which have been steered away from the central position to be moved back to it. In this way, the forces required for the purpose are greater at low vehicle speeds than at higher vehicle speeds. It is therefore likewise within the scope of the invention for the return torque which is preset or generated to be dependent, at equal steering angles, on the speed of the vehicle in the second driving or operating state.

In all the possible embodiments, it is possible in this case for the threshold value for the torque to be a constant value. It is however equally possible for the threshold for the torque, by which the two driving states which are essential to the invention are distinguished from one another, to vary with the speed of the vehicle.

Figure 2:
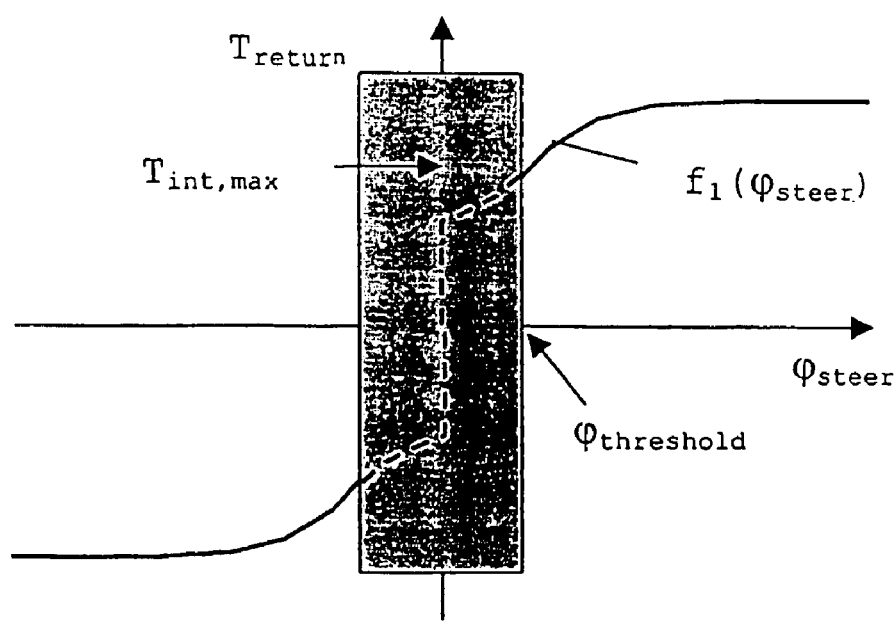
FIG. 2 shows a further function curve for the return torque.

In an embodiment of the simplest kind, as has already been described and as is shown in FIG. 2, a return torque curve $f_1(\phi_{steer})$ of the kind shown by the solid line in FIG. 2 is assigned to the first driving state. The return torque curve assigned to the second driving state, i.e. where a manual torque is below the threshold value, is of the kind shown by the dashed line in FIG. 2. The box indicates that a distinction is made between the two driving states only at steering angles $\phi_{steer}$ which are smaller than $\phi_{threshold}$. The distinction between the driving states need not be dependent on $\phi_{threshold}$ however.

In a second possible embodiment, the first driving state is likewise assigned a return torque curve $f_1(\phi_{steer})$ of the kind shown by the solid line in FIG. 1, whereby a harmonized feel is produced for and conveyed by the steering when the zero position of the steering angle $\phi_{steer}$ is steered through. The return torque curve $f_1(\phi_{steer})$ assigned to the second driving state, i.e. where a manual torque is below the threshold value, is of the kind shown by the solid line in FIG. 1, but an additional torque $T_{int}$ is added to this torque curve. This additional torque $T_{int}$ may be of a constant value. It is however equally possible for the additional torque $T_{int}$ to be a function of the steering angle and/or of the speed of the vehicle.

The return torque that is obtained for the two driving states is thus as follows:

$T_{return}=f_1(\phi_{steer})$  Driving state I $T_{return}=f_2(\phi_{steer})=f_1(\phi_{steer})+T_{int}$, or $T_{return}=f_1(\phi_{steer})+T_{int}(\phi_{steer})$ or $T_{return}=f_1(\phi_{steer})+T_{int}(\phi_{steer}, v_{vehicle})$.  Driving state II In a particularly advantageous embodiment, the additional torque $T_{int}$ is calculated by integrating the steering angle over time.

In theory, there are thus a plurality of possible ways of calculating $T_{int}$.

In the simplest case, the steering angle is integrated over time:

$T_{int}=m\int \phi_{steer}dt$.

If the steering angle remains the same, the additional torque $T_{int}$ thus becomes greater with time. So that it does not become too great, it is sensible for $T_{int}$ to be limited to a maximum value $T_{int,max}$. $T_{int,max}$ may depend in this case on speed and/or on the steering angle. In this integration, the rate of integration is dependent only on the constant m.

It has been found that more comfortable steering can be obtained if the rate of integration also depends on the speed of the vehicle. In this way, a drive of excellent comfort can be obtained by using integration as follows:

$T_{int}=\int k(v_{vehicle})\phi_{steer}dt$

In principle, the function $k(v_{vehicle})$ can be selected to be as desired in this case. However, it has been found useful for the rate of integration to increase as the speed of the vehicle increases. By selecting the rate of integration in this way, it is ensured that no additional return torque $T_{int}$, or one which is only negligibly small, is generated when the zero position is steered through quickly. An additional return torque $T_{int}$ is only ever generated when the steering wheel is in the region of the zero position and the driver does not have his hands on it. FIG. 3 is a flow chart for the last embodiment elucidated.

With all the embodiments which are described in the present patent application, it is possible for the two driving states to be distinguished, on the basis of the manual torque applied to the steering handle or steering wheel, only at small steering angles, and for only one return torque curve $f_1(\phi_{steer})$ to exist for all manual torques when the steering angle $\phi_{steer}$ is above a threshold value $\phi_{threshold}$. Advantageously, any integration is stopped in this way at small steering angles (which are wanted by the driver). The integrator therefore responds only if the torque $T_{driver}$ applied by the driver is below a certain value $T_{threshold}$ and the steering angle $\phi_{steer}$ is below a threshold value $\phi_{threshold}$.

With all the embodiments described above, it is also possible for the residual angle $\phi_{threshold}$ too to depend on the speed of the vehicle $v_{vehicle}$. It is therefore important for good driving comfort for the residual angle $\phi_{threshold}$ to become smaller as the speed of the vehicle increases.

The specification incorporates by reference the disclosure of German priority document 102 08 673.7 filed Feb. 28, 2002 and PCT/EP02/13722 filed Dec. 4, 2002.

The present invention is, of course, in no way restricted to the specific disclosure of the specification and drawings, but also encompasses any modifications within the scope of the appended claims.

The invention claimed is:

1. A vehicle steering system having a steering handle for steering at least one wheel, comprising:
   an arrangement for applying torque to said steering handle, and
   a sensor for detecting a steering torque applied to said steering handle by a person steering said vehicle, wherein said arrangement generates a return torque, which is a function of the steering angle, and wherein said return torque drives said steering angle into a central position,
   wherein during a first driving state in which an applied steering torque is above a threshold value, a function curve of said return torque increases monotonically and no return torque is generated at a steering angle of zero degrees, and
   wherein during a second driving state in which an applied steering torque is below the threshold value, said arrangement generates a return torque that is greater than that given by said function curve of said return torque in said first driving state, at least at small steering angles.

2. A vehicle steering system according to claim 1, wherein a function curve of said return torque is a function of vehicle speed during said second driving state.

3. A vehicle steering system according to claim 1, wherein a resulting return torque for said second driving state is composed or calculated from a sum of said function curve for said return torque and an additional torque.

4. A vehicle steering system according to claim 3, wherein said additional torque is a function of at least one of vehicle speed and steering angle.

5. A vehicle steering system according to claim 3, wherein said additional torque is calculated from the intergral $T_{int}=m\int \phi_{steer}dt$ wherein $\phi_{steer}$ is the steering angle, and m is a constant.

6. A vehicle steering system according to claim 3, wherein said additional torque is calculated from the integral $T_{int}=\int k(v_{vehicle})\phi_{steer}dt$ Where the $\phi_{steer}$ is the steering angle, and k is a speed-dependent constant or is a function of the vehicle speed $v_{vehicle}$.

7. A vehicle steering system according to claim 6, wherein the rate of integration is controlled by k.

8. A vehicle steering system according to claim 6, wherein the function k ($v_{vehicle}$) increases monotonically.

9. A vehicle steering system according to claim 3, wherein said additional torque is limited to a maximum value.

10. A vehicle steering system according to claim 9, wherein said maximum value of said additional torque is a function of the speed of said vehicle.

* * * * *

UNITED STATES PATENT AND TRADEMARK OFFICE
CERTIFICATE OF CORRECTION

| | | |
|---|---|---|
| PATENT NO. | : 7,181,325 B2 | Page 1 of 1 |
| APPLICATION NO. | : 10/505726 | |
| DATED | : February 20, 2007 | |
| INVENTOR(S) | : Niessen et al. | |

It is certified that error appears in the above-identified patent and that said Letters Patent is hereby corrected as shown below:

<u>Title page,</u>
Item [54] should read as follows:

[54] VEHICLE STEERING SYSTEM HAVING ARRANGEMENT FOR VARIABLE CENTERING

Item [75] should read as follows:

[75] Inventors: Harwin Niessen, Kirchheim u. Teck (DE); Roman Frank Starbek, Esslingen (DE)

Signed and Sealed this

Tenth Day of April, 2007

JON W. DUDAS
*Director of the United States Patent and Trademark Office*